O. LINKER.
APPARATUS FOR STERILIZING LIQUIDS BY MEANS OF ULTRA VIOLET RAYS.
APPLICATION FILED JUNE 3, 1913.
1,079,503.
Patented Nov. 25, 1913.
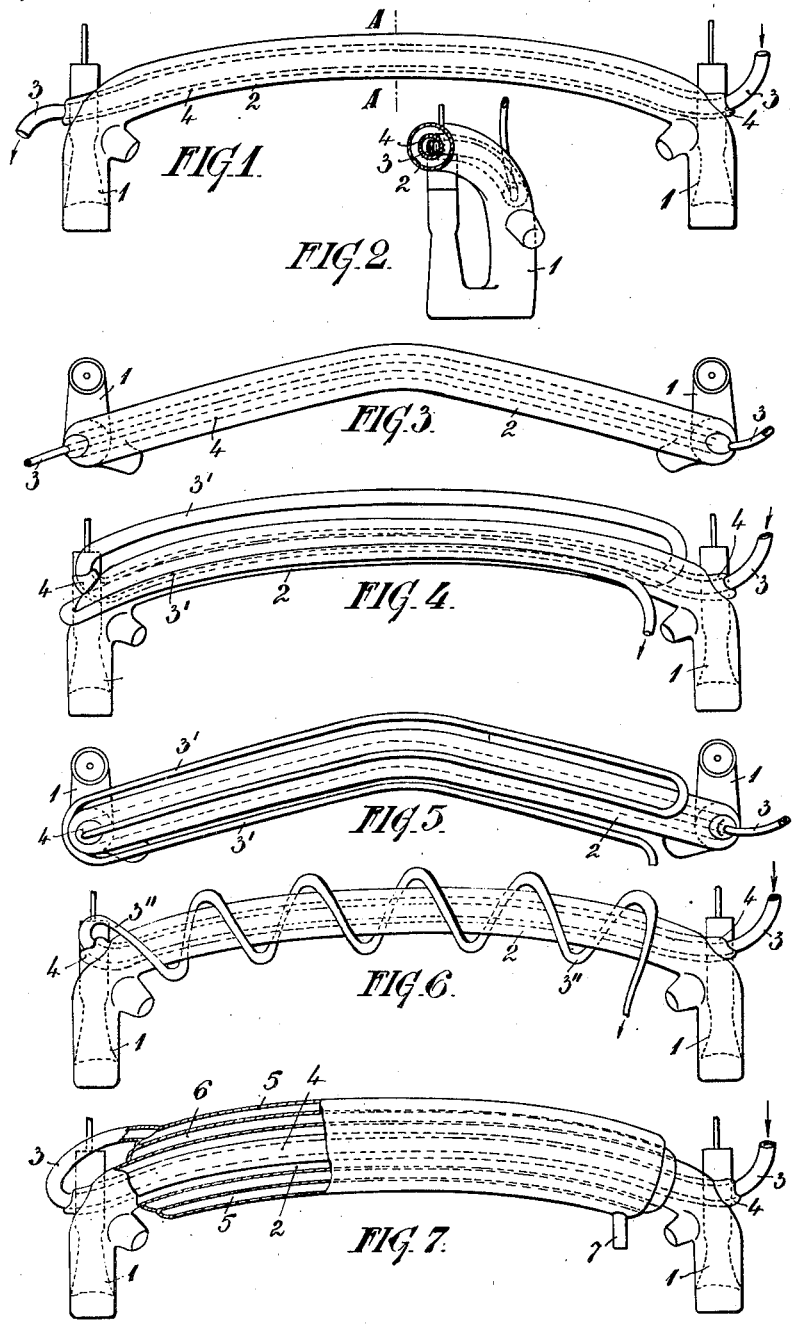
Witnesses:
C. H. Fesler
M. C. Langley
Inventor:
Oskar Linker

UNITED STATES PATENT OFFICE.

OSKAR LINKER, OF LEIPZIG, GERMANY.

APPARATUS FOR STERILIZING LIQUIDS BY MEANS OF ULTRA-VIOLET RAYS.

1,079,503.  Specification of Letters Patent.  Patented Nov. 25, 1913.

Application filed June 3, 1913. Serial No. 771,425.

*To all whom it may concern:*

Be it known that I, OSKAR LINKER, a citizen of the German Empire, and residing at Leipzig, Germany, have invented a certain new and useful Improved Apparatus for Sterilizing Liquids by Means of Ultra-Violet Rays, of which the following is a specification.

My invention relates to apparatus for sterilizing liquids by means of ultraviolet rays.

Apparatuses known at the present day for treating liquids by means of ultraviolet rays may be divided into two groups, namely into those in which the quartz lamp for producing the ultraviolet rays is inserted without a protective casing or jacket into the liquid to be sterilized, and into those in which the quartz lamp is protected wholly or partially by a quartz jacket or casing from contacting directly with the liquid to be sterilized, the intermediate space or chamber between the jacket and the lamp being evacuated as much as possible. It is however to be noted that heretofore the protective jacket or casing in question solely served for protecting the entire lamp or parts thereof from being too severely cooled by the liquid to be sterilized.

My invention is based on the recognition of the fact that when treating colloidal liquids, such as milk, alcoholic and other liquids, by means of ultraviolet rays it is desirable to subject the liquid to be treated in the form of a relatively thin layer to the action of the ultraviolet rays. The liquid to be sterilized should not directly contact with the walls of the source of the rays. When employing mercury vapor lamps the purpose of this is that the liquid shall not be heated. In addition, disadvantages which need not be more particularly described are obviated, particularly those produced by the action of the gases which are generated at the electrodes when the lamps are burning or otherwise. Further, it is important that the ultraviolet rays be afforded an opportunity of not only penetrating from all sides into the liquid to be treated, but also acting for a sufficiently long time on it. Lastly, it is desirable to be able to cut off any undesired action of certain categories of rays, *e. g.* by the filtration of rays of predetermined wave lengths.

According to my invention I attain all these ends by using apparatus such as are represented by way of example in the accompanying drawing.

For obtaining the above-mentioned effects it is immaterial whether the ultraviolet rays are produced in the apparatus by simple mercury vapor lamps or by mercury vapor lamps filled with special gases or in Geissler tubes filled with gases suitable for this purpose, or by any other suitable source of rays.

Four forms of apparatus according to my invention are represented by way of example in the accompanying drawing, wherein:—

Figure 1 is an elevation showing the first form, Fig. 2 a cross-section taken on the line A—A in Fig. 1, and Fig. 3 a top plan view thereof; Figs. 4 and 5 are elevation and top plan view, respectively, showing the second form; Fig. 6 is an elevation showing the third form, and Fig. 7 is an elevation, partly in section, showing the fourth form.

Referring firstly to Figs. 1 to 3, in this form of my apparatus the ultraviolet rays are produced by a mercury vapor lamp made of quartz or of any other suitable material which allows ultraviolet rays to pass through it, the luminous tube proper 2, 4 located between the electrodes 1, 1 being constituted by two tubes 2 and 4 in such manner that a hollow space or chamber is formed in the interior, through which is passed the tube 3 for conducting the liquid to be sterilized. This tube 3 which is likewise made from quartz or any other suitable material transparent to ultraviolet rays is connected air-tight with the walls of the lamp at its two ends projecting out of the lamp and the intermediate space or chamber between the tube 3 and the inner tube 4 of the luminous tube is evacuated as highly as possible, or there is at least one opening at each end of the lamp—or the tube 3 passes out freely at the ends of the lamp— in order to be able to pass through the chamber between the tubes 3 and 4 a suitable liquid which in the present instance will simultaneously serve as a cooling liquid for the liquid being sterilized. In the latter case this liquid flowing through the intermediate chamber and surrounding the tube 3 can be simultaneously used, if necessary, as a filter in order to allow only rays of a predetermined and desired wave length to act on the liquid to be sterilized flowing in the interior of the tube 3. The action of this liquid filter is dependent on the kind of liquid employed for this purpose and on the dimensions selected for the chamber surrounding the tube 3 and the thickness determined thereby of the layer of liquid flowing therethrough. For example, ultraviolet rays of the smallest wave length are completely absorbed by a layer of clear water a few millimeters thick.

When using the above-described apparatus the liquid to be sterilized is passed through the tube 3 in the direction of the arrows after the arc in the lamp has been formed previously in known manner. As the liquid to be sterilized is conducted through the middle of the luminous tube of the lamp emitting the ultraviolet rays it is exposed on all sides to these rays and the rays act exceedingly intensively on the liquid in the tube 3.

When in use, the apparatus is preferably inserted into a vessel through which cooling or filtering liquid is passed. This vessel may consist of glass, porcelain or metal, and in the latter case may be nickel-plated or galvanized on the inside. The cooling or filtering liquid conducted through this vessel is likewise sterilized by the rays issuing from the lamp and after being used as a cooling or filtering liquid can be employed again for other suitable purposes.

Referring now to Figs. 4 and 5, this form enables the ultraviolet rays which are produced to be more favorably utilized, the liquid to be sterilized being conducted in addition through the field of ultraviolet rays outside the luminous tube 2, 4. For this purpose, a portion 3' of the tube 3 is arranged in several turns near the luminous tube 2, 4 of the lamp at a predetermined distance therefrom.

The form of apparatus represented in Fig. 6 likewise allows the ultraviolet rays to be more favorably utilized. In this apparatus the portion 3" of the tube 3 is arranged in coils about the luminous tube 2, 4 at a predetermined distance therefrom.

The form of apparatus shown in Fig. 7 also utilizes the ultraviolet rays very efficiently. The tube 3 issuing from the lamp is here connected with a chamber 5 which surrounds the luminous tube 2, 4 at a predetermined distance. The intermediate space or chamber 6 between this chamber and the lamp is closed at both ends and evacuated. At the end of the chamber 5 remote from the inlet of the tube 3 into the same is a branch pipe 7. The intermediate space or chamber between the chamber 5 and the lamp may be open and used for the circulation of cooling or filtering liquid. Instead of the chamber 5 completely surrounding the part 2 of the lamp, the same may only partially surround the latter.

The apparatuses shown in Figs. 4 to 7 are used similarly to the apparatus disclosed in Figs. 1 to 3. These apparatuses are also inserted into a receptacle which contains the cooling or filtering liquid and is provided with an inlet and outlet. The liquid to be sterilized may be passed through the tube 3 in a direction opposite to that indicated by the arrows and under pressure, if desired.

I claim:—

1. An apparatus of the character described consisting of a lamp emitting ultra-violet rays and having an opening extending the length thereof, and a liquid conveying conduit passed through the opening and extending beyond the ends of the lamp and diverging from the electrodes thereof, said conduit being out of contact with the wall of the opening throughout its entire length.

2. An apparatus of the character described consisting of an elongated lamp emitting ultra-violet rays and having an opening extending centrally therethrough, and an integral liquid conveying pipe of substantially uniform diameter passed entirely through the opening in the lamp and trained over the outer surface thereof, said pipe being out of contact with the walls of said lamp throughout its entire length.

3. An apparatus of the character described comprising an elongated lamp adapted to emit ultra-violet rays and having an opening extended centrally therethrough, and an integral liquid conveying pipe of substantially uniform diameter passing through the opening in the lamp and trained over the outer surface thereof, said conduit being out of contact with the walls of said lamp, the opposite ends of the opening in the lamp being sealed about said pipe to provide a dead air space between the wall of the lamp and said pipe.

In testimony whereof, I affix my signature in the presence of two witnesses.

OSKAR LINKER.

Witnesses:
HENRY HASPER,
WOLDEMAR HAUPT.